United States Patent [19]

Kwa

[11] Patent Number: 4,890,894
[45] Date of Patent: Jan. 2, 1990

[54] OPTICAL CONNECTOR
[75] Inventor: Peter T. H. Kwa, Kanata, Canada
[73] Assignee: Northern Telecom Limited, Montreal, Canada
[21] Appl. No.: 207,569
[22] Filed: Jun. 16, 1988
[51] Int. Cl.⁴ .............................................. G02B 6/36
[52] U.S. Cl. .................................................. 350/96.20
[58] Field of Search ............... 350/96.15, 96.17, 96.18, 350/96.20, 96.21; 250/227, 552; 357/17, 19, 30, 74, 80

[56] References Cited
U.S. PATENT DOCUMENTS

| | | | |
|---|---|---|---|
| 4,439,006 | 3/1984 | Stevenson | 350/96.20 |
| 4,658,130 | 4/1987 | Durbin | 350/96.20 X |
| 4,699,455 | 10/1987 | Erbe et al. | 350/96.20 |
| 4,707,067 | 11/1987 | Haberland et al. | 350/96.20 |
| 4,730,891 | 3/1988 | Poorman | 350/96.18 X |

Primary Examiner—William L. Sikes
Assistant Examiner—Phan T. Heartney
Attorney, Agent, or Firm—C. W. Junkin

[57] ABSTRACT

An optical connector comprises two optical connector bodies, each carrying an optical element such as an optical fiber, a lens, an optical source or an optical detector. Each optical connector body has a guide formation extending in a direction transverse to the optical axis of its respective optical element and a stop means extending in a direction transverse to its respective guide formation. Sliding engagement of the guide formations guides relative movement of the connector bodies in a direction transverse to the optical axes to bring the stop means into engagement and the optical axes into alignment. The optical connector is particularly suited to optical interconnection of circuit boards slidably mounted in card guides.

25 Claims, 8 Drawing Sheets

OPTICAL CONNECTOR

The present invent to optical connectors.

Terminal equipment for fiber optic communications systems includes electronic transmitter circuitry which drives an optical source, such as a laser diode, and electronic receiver circuitry which is fed by an optical detector, such as an avalanche photodiode. The electronic transmitter and receiver circuitry is electrically connected to other electronic terminal equipment, such as multiplexers, demultiplexers, and digital cross-connects. The optical source and detector are connected to an optical fiber which provides a transmission path between the terminal equipment and other similar terminal equipment at a remote location.

The electronic circuitry, optical source and optical detector are typically mounted on printed circuit boards which are suitably received in card guides mounted to an equipment frame. A back plane mounted to the rear of the frame includes board edge connectors aligned with the card guides and electrical conductors interconnecting the board edge connectors. The circuit boards are provided with board edge electrical contacts which are received in the board edge connectors when the circuit boards are slidably inserted in the card guides to electrically connect the circuitry to the electrical conductors on the back plane. The electrical conductors provide the required electrical connections between circuit boards.

The circuit boards also include optical connector parts which are optically coupled to the optical sources and to the optical detectors of the receivers and transmitters. The board mounted optical connector parts must be mated with frame mounted optical connector parts to optically connect the optical sources and the optical detectors to optical fibers terminating on the frame mounted optical connectors.

Most optical connector parts are provided with screw or bayonet type fittings. Thus, the optical connector parts must be rotatably mated after the circuit boards are inserted and rotatably unmated before the circuit boards are withdrawn. The optical connector parts must be mounted where they are manually accessible when the circuit boards are mounted in the frame, for example at the front of the frame. This is not always convenient or possible, particularly when the frame carries a large number of densely packed circuit boards. Moreover, operators may forget to rotatably mate the optical connector parts when inserting a circuit board, leaving the circuit board optically disconnected, or may forget to rotatably unmate the optical connector parts when removing a circuit board, physically damaging the circuit board, connector parts or optical fibers.

Some of the above problems have been overcome by providing back plane mounted optical connector parts which slidably receive circuit board mounted optical connector parts to effect an optical connection. In this case, a single circuit board insertion operation effects electrical connections by insertion of board edge electrical contacts into back plane mounted board edge electrical connectors and simultaneously effects optical connections by insertion of circuit board mounted optical connector parts into back plane mounted optical connector parts.

Unfortunately, in the known board edge optical connector arrangements the circuit board mounted optical connector parts are mounted at leading edges of the circuit boards. These leading edges are already congested with board edge electrical contacts. Moreover, in the known board edge optical connector arrangements the frame mounted optical connector parts are mounted at the back plane which is already congested with electrical board edge connectors and electrical conductors.

The present invention provides an optical connector which can be used to avoid some or all of the problems described above.

One aspect of the invention provides an optical connector comprising:

a first connector body carrying a first optical element having a first optical axis, the first connector body having a first guide formation extending in a direction transverse to the first optical axis and a first stop means extending in a direction transverse to the first guide formation; and a second connector body carrying a second optical element having a second optical axis, the second connector body having a second guide formation extending in a direction transverse to the second optical axis and a second stop means extending in a direction transverse to the second guide formation, sliding engagement of the first guide formation with the second guide formation guiding movement of the first connector body with respect to the second connector body in a direction transverse to the first and second optical axes to bring the first stop means into engagement with the second stop means and the first optical axis into alignment with the second optical axis.

Alignment of the first and second optical axes effects an optical connection between the optical elements. One of the connector bodies may be mounted to a frame adjacent to a card guide and carry an optical element in the form of a lens optically coupled to an optical fiber. The other of the connector bodies may be mounted to a circuit board adjacent a side edge of the circuit board and carry an optical element in the form of another lens optically coupled to an optoelectronic device. Insertion of the circuit board into the card guide aligns the optical connector bodies to optically connect the optoelectronic device to the fiber via the lenses.

The fiber may terminate at another frame mounted connector body for optical connection to an optoelectronic device on another circuit board. The other circuit board may be mounted in the same frame or in another frame with the fiber extending within a cable jacket between the two frames.

Thus another aspect of the invention provides an assembly for electrical and optical interconnection of circuit boards, comprising:

at least one frame comprising a plurality of card guides and an electrical back plane, the electrical back plane carrying a plurality of electrical board edge connectors and a plurality of electrical conductors interconnecting the board edge connectors, each board edge connector aligned with a respective pair of the card guides;

a plurality of optical connector parts mounted to the frame forward of the electrical back plane and between the card guides;

optical waveguide means interconnecting frame mounted optical connector parts; and a plurality of circuit boards slidably received in the card guides, the circuit boards having board edge electrical contacts on leading edges of the circuit boards and optical connector parts at side edges of the circuit boards, sliding insertion of the circuit boards into the card guides urging the board edge electrical contacts into the board edge connectors to electrically interconnect the circuit boards and aligning the board mounted optical connector parts with the frame mounted optical connector parts to optically interconnect the circuit boards.

Hence, the invention provides an optical connector which can be used to effect optical connection upon insertion of a circuit board into a frame while avoiding congestion of a leading edge of the circuit board and avoiding congestion of a back plane of the frame by mounting the frame mounted optical connector part forwardly of the backplane between the card guides and by mounting the board mounted connector part adjacent a side edge of the circuit board.

The optical elements carried by the connector bodies may be optical fibers, lenses, optical sources, optical detectors or any combination of these items. For example, both of the optical connector bodies may carry an optical element in the form of a lens which is optically coupled to a respective optical fiber, so that insertion of the circuit board into the card guide aligns the optical connector bodies to optically interconnect the optical fibers via the lenses.

A plurality of optical elements having parallel optical axes may be carried by each optical connector body, alignment of the optical connector bodies bringing each optical element of on connector body into optical alignment with a respective optical element of the other connector body to make a plurality of optical connections.

Embodiments of the invention are described below by way of example only with reference to the accompanying drawings, in which.

Figure 1:
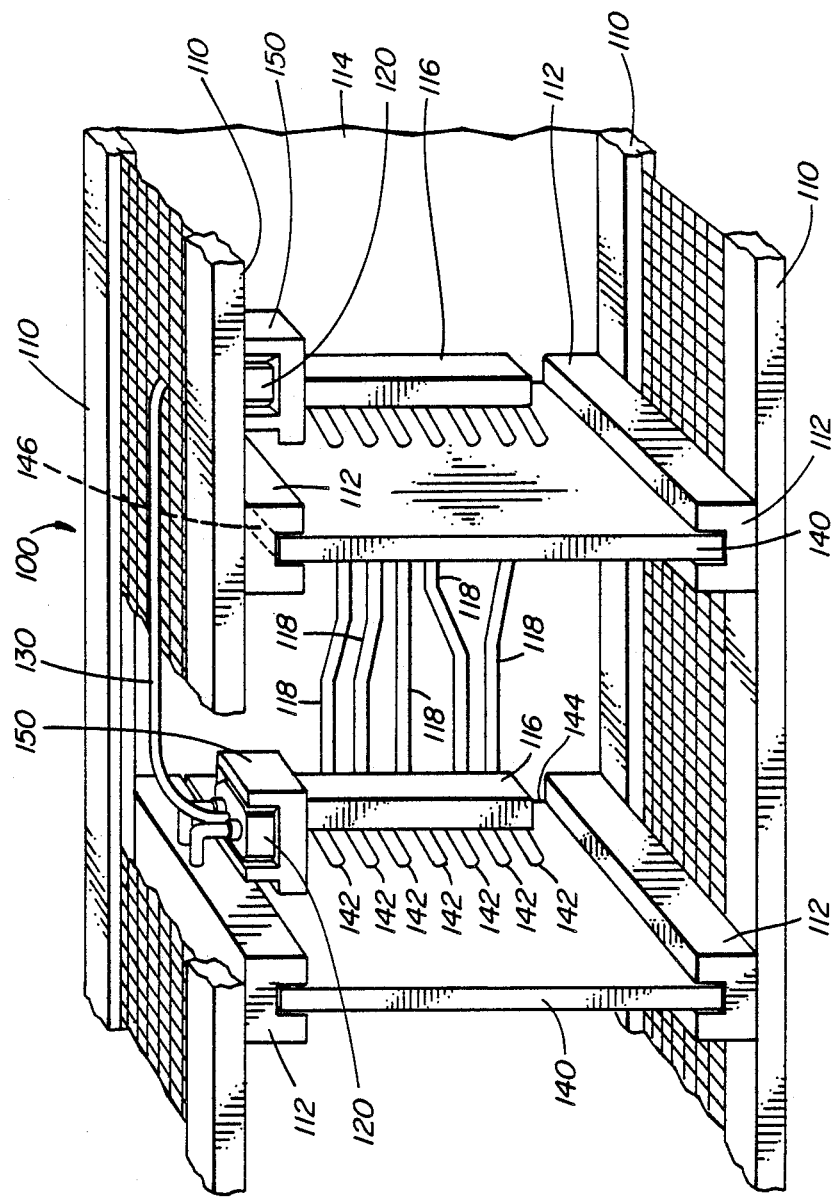
FIG. 1 is a perspective view of an equipment frame containing circuit boards, the equipment frame partially cut away to show optical connectors according to a first embodiment.

Referring to FIG. 1, an assembly 100 for electrical and optical interconnection of circuit boards comprises a frame for supporting the circuit boards. The frame comprises four transverse frame members 110 which define the top, bottom, front and rear of the frame, a plurality of card guides 112 mounted to the frame members 110 to span the frame from front to rear, and an electrical back plane 114 mounted to the frame members 110 to span the rear of the frame. The back plane 114 comprises a printed circuit board carrying a plurality of board edge connectors 116, each of which is aligned with a respective pair of the card guides 112 and a plurality of electrical conductors in the form of printed electrical conductor traces 118 interconnecting the board edge connectors 116.

The assembly 100 further comprises a plurality of optical connector parts 120 mounted to the card guides 112 forward of the electrical back plane 114, and optical waveguide means in the form of optical fibers 130 interconnecting the frame mounted optical connector parts 120.

The assembly 100 also comprises a plurality of circuit boards 140 slidably received in the card guides 112. The circuit boards 140 have board edge electrical contacts 142 on leading edges 144 of the circuit boards, and optical connector parts 150 spaced forwardly of the leading edges 144 adjacent side edges 146 of the circuit boards 140.

Sliding insertion of the circuit boards 140 into the card guides 112 urges the board edge electrical contacts 142 into the board edge electrical connectors 116 to electrically interconnect the circuit boards, and aligns the optical connector parts 120, 150 in a direction transverse to the direction of insertion. This alignment of the optical connector parts 120, 150 effects an optical connection as described below to optically interconnect the circuit boards 140.

Figure 2:
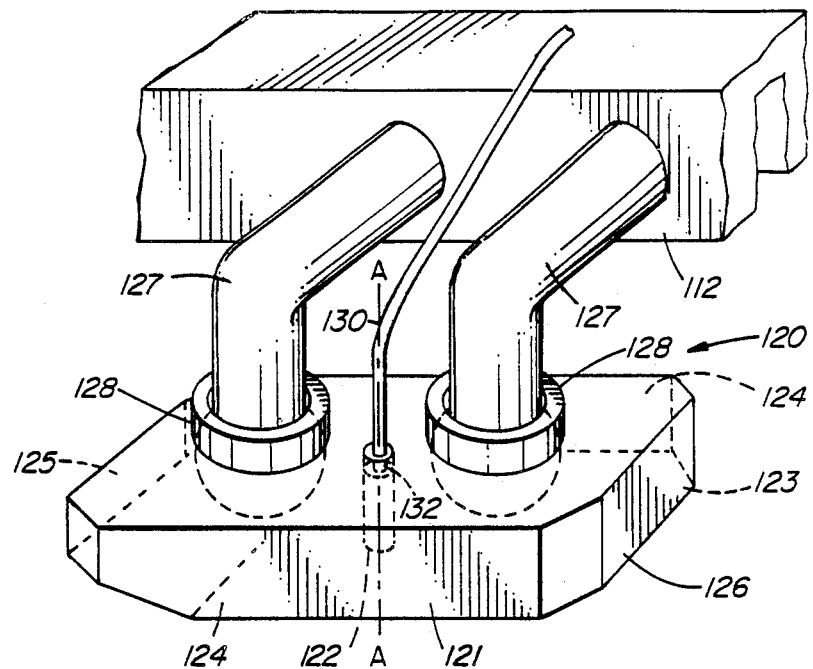
FIG. 2 is a perspective view of a frame mountable optical connector part of the optical connector of FIG. 1.

Referring to FIG. 2, the frame mounted optical connector parts 120 each comprise a connector body in the form of a plug member 121 carrying an optical element in the form of a graded index rod lens 122 having an optical axis A—A The plug member 121 has a guide formation in the form of external base and side surfaces 123, 124 which extend in a direction transverse to the optical axis A—A. A leading edge 125 of the plug member 121 is bevelled at the external base and side surfaces 123, 124. A trailing edge 126 of the plug member 121 is also bevelled at the external side surfaces 124. The bevelled leading edge 125 acts as a stop means and the bevelled trailing edge 126 coacts with latching means as described below.

The plug member 121 further comprises resilient mounting means in the form of resiliently deformable arms 127 which join the plug member 121 to an adjacent card guide 112. The arms 127 are secured to the plug member 121 by means of ball-in-socket joints 128.

A free end 132 of one of the optical fibers 130 is secured by means of epoxy bonding on the optical axis A—A to optically couple the fiber 130 to the lens 122.

Figure 3:
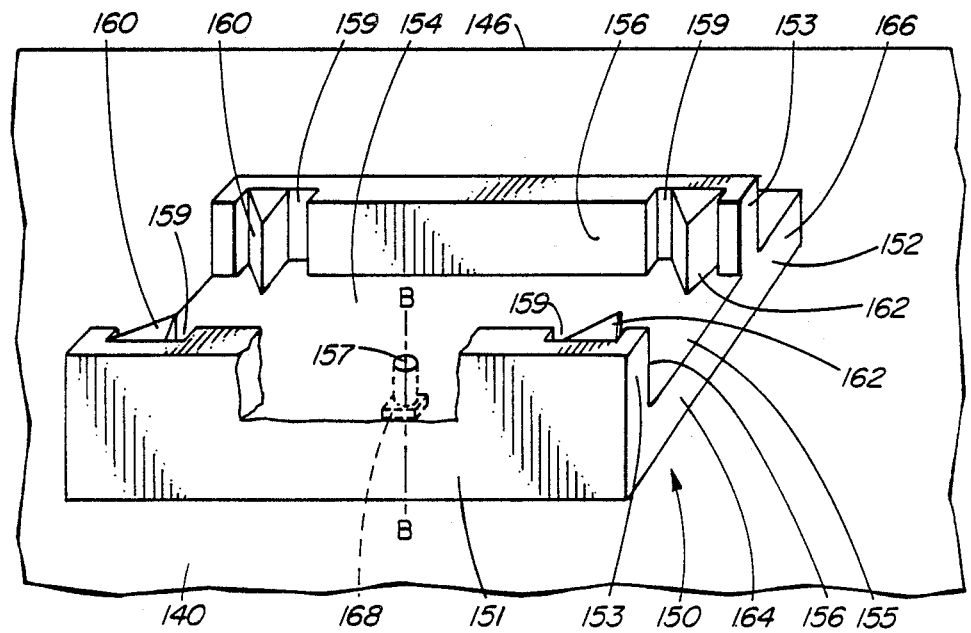
FIG. 3 is a perspective view of a circuit board mountable optical connector part of the optical connector of FIG. 1 shown partially cut away to reveal its internal structure.

Referring to FIG. 3, the board mounted optical connector parts 150 each comprise a connector body in the form of a receptacle member 151. The receptacle member has a channel formation in the form of a base 152 and side walls 153 defining a channel 154. The base 152 of the channel formation carries an optical element in the form of a lens 157 having an optical axis B—B. The receptacle member 151 has a guide formation in the form of internal base and side surfaces 155, 156 of the channel 154 which extend in a direction transverse to the optical axis B—B.

The receptacle member 151 has stop means in the form of a pair of stop elements, each stop element comprising a triangular spring 160 projecting inward from a respective recess 159 in a respective internal side surface 156 of the channel 154. The triangular springs 160 are complementary to the bevelled leading edge 125 of the plug member 121.

The receptacle member 151 also has opposed resilient means in the form of a pair of triangular springs 162 projecting inward from respective recesses 159 in respective internal side surfaces 156 of the channel 154 at a location disposed between the stop element triangular springs 160 and a leading edge 164 of the receptacle member 151. The leading pair of triangular springs 162 act as releasable latching means as described below, and are complementary to the bevelled trailing edge 126 of the plug member 121.

The receptacle member 151 further comprises rigid mounting means in the form of a rigid mounting foot 166 which is secured to the circuit board 140 at a location spaced inwardly from the side edge 146 of the circuit board.

The receptacle member 151 also carries an optoelectronic device 168, for example an optical source or an optical detector, on the optical axis B—B. The optoelectronic device 168 is optically coupled to the lens 157.

When circuit boards 140 are inserted into card guides 112, the circuit boards slide rearward within the card guides until the leading edges 144 of the circuit boards contact the back plane 114 and the board edge electrical contacts 142 enter the board edge electrical connectors 116 to electrically interconnect the circuit boards 140.

Figure 4A:
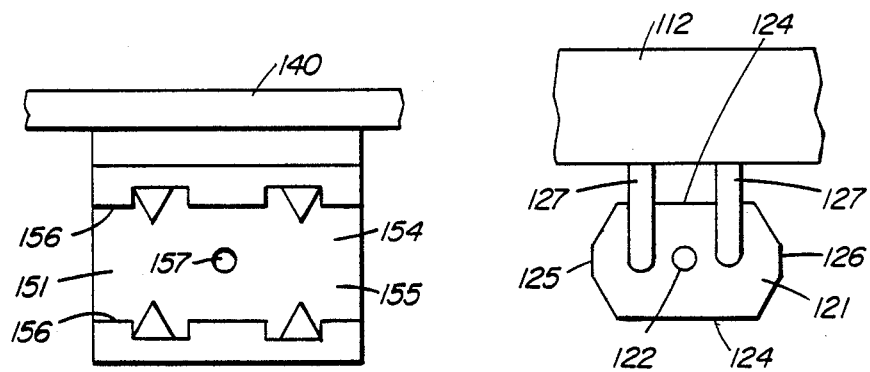
FIGS. 4a–4c are top views of the optical connector parts of FIGS. 2 and 3 in successive positions as the optical connector parts are mated.
Figure 4B:
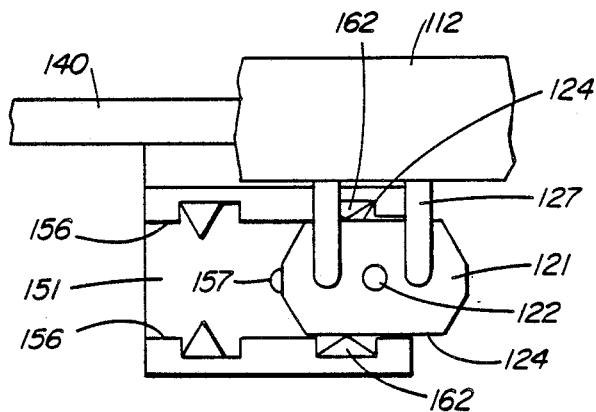
Figure 4C:
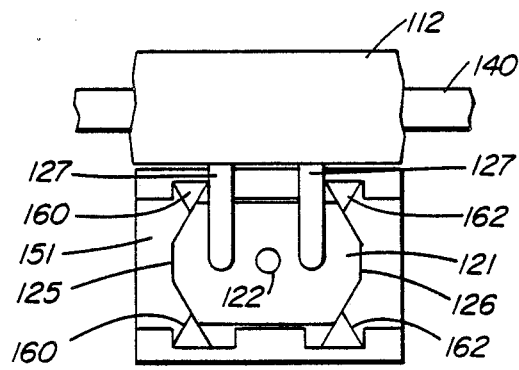
Figure 5A:
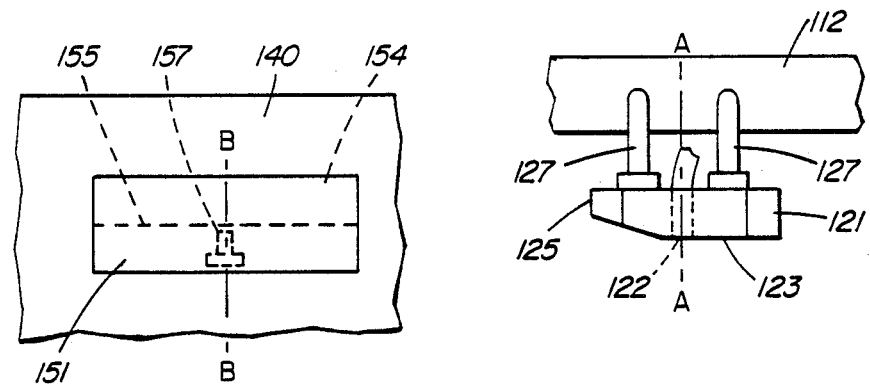
FIGS. 5a–5c are side elevational views of the optical connector parts of FIGS. 2 and 3 in successive positions as the optical connector parts are mated.
Figure 5B:
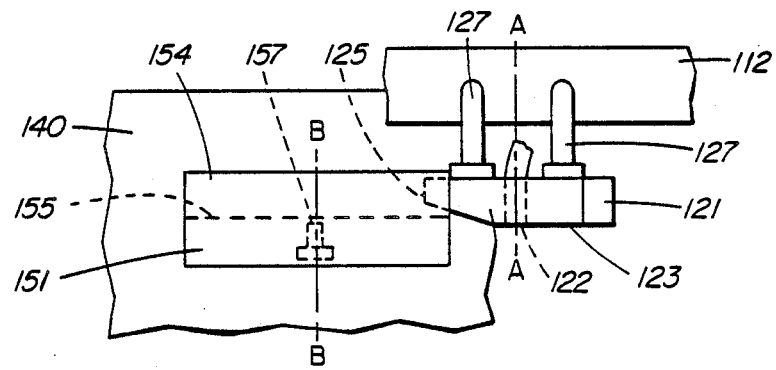
Figure 5C:
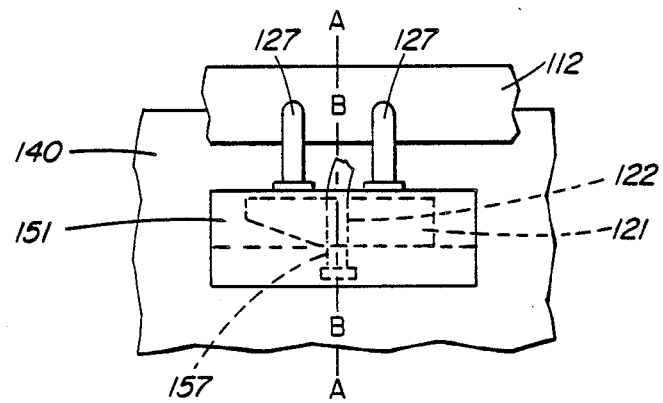

Referring to FIGS. 4 and 5, as the circuit boards 140 slide rearward within the card guides 112, the optical connector receptable members 151 engage the optical connector plug members 121, the internal base and side surfaces 155, 156 of the receptacle members 151 slidably engaging the external base and side surfaces 123, 124 of the plug members 121 to guide the receptacle members 151 in a direction transverse to the optical axes A—A, B—B over the plug members 121. The bevelled leading edges 125 of the plug members 121 facilitate entry of the plug members 121 into the channels 154 of the receptacle members 151.

As the receptacle members 151 slidably engage the plug members 121, the leading triangular springs 162 compress to permit sliding motion of the plug members 121 within the channels 154 as shown in FIG. 4(b). Once the leading triangular springs 162 have passed the trailing edges 126 of the plug members 121, they spring inward to inhibit sliding motion of the plug members 121 within the channels 154, thereby latching the plug members 121 within the channels 154 of the receptacle members 151 as shown in FIG. 4(c). At the same time, the stop element triangular springs 160 engage the bevelled leading edges 125 of the plug members 121 to fix the position of the plug members 121 within the channels 154. The resilient arms 127 joining the plug members 121 to the card guides 112 deform as necessary to enable the plug members 121 to enter and take the desired position between the pairs of triangular springs 160, 162 within the channels 154.

The distance between the external side surfaces 124 of the plug members 121 and the optical axes A—A is substantially equal to the distance between the internal side surfaces 156 of the channels 154 and the optical axes B—B. The distance between the bevelled leading edges 125 of the plug members 121 and the optical axes A—A is substantially equal to the distance between the stop element triangular springs 157 and the optical axes B—B. As a result, when the plug members 121 are latched in position in the channels 154, the optical axes A—A are aligned in a direction transverse to the direction of insertion with the optical axes B—B, and the optical devices 168 are optically coupled to the fibers 130 via the lenses 122, 158.

Of course, the outer dimensions of the plug member 121 must be very slightly smaller than the internal dimensions of the receptacle member 151 to permit sliding movement of the plug member 121 within the channel 154. The triangular springs 160, 162 bias the plug member 121 both laterally and longitudinally to centre the plug member 121 both laterally and longitudinally within the channel 154 when the plug member 121 is latched to the receptacle member 151. The resilient arms 127 deform laterally and the ball-in-socket joints 128 swivel as necessary to permit such centering action.

In order to ensure that plug member 121 is urged firmly against the receptacle member 151 in a direction parallel to the optical axes A, B, the plug member 121 is mounted slightly lower than the receptacle member 151. As shown in FIG. 5(b), the bevelled leading edge 125 of the plug member 121 rides over the leading edge of the receptacle member 151 into the channel 154. The resilient arms 127 deform vertically and the ball-in-socket joints 128 swivel as necessary to permit such action. The resilient arms 127 urge the plug member 121 downward against the base surface 155 of the receptacle member 151 when the plug member 121 is latched to the receptacle member 151.

Thus, the relative positions of the receptacle and plug members 121, 151 and the lenses 122, 157 which they carry are completely determined in three dimensions when the plug member 121 is latched to the receptacle member 151.

The members 121, 151 may be unlatched by pulling the circuit boards 140 with sufficient force to compress the latching triangular springs 162.

In the assembly 100, the members 121, 151 are mounted well forward of the back plane 114 and the leading edge 144 of the circuit board 140. This positioning of the members 121, 151 does not interfere with the placement of electrical board edge connectors 116 on the back plane 114 or with the placement of board edge contacts 142 on the circuit board 140. Moreover, the interconnecting fibers 130 are mounted well forward of the back plane 114 so as to remain separate from electrical cables which may be connected to the back plane 114 for electrical connection of the frame to other frames.

Figure 6:
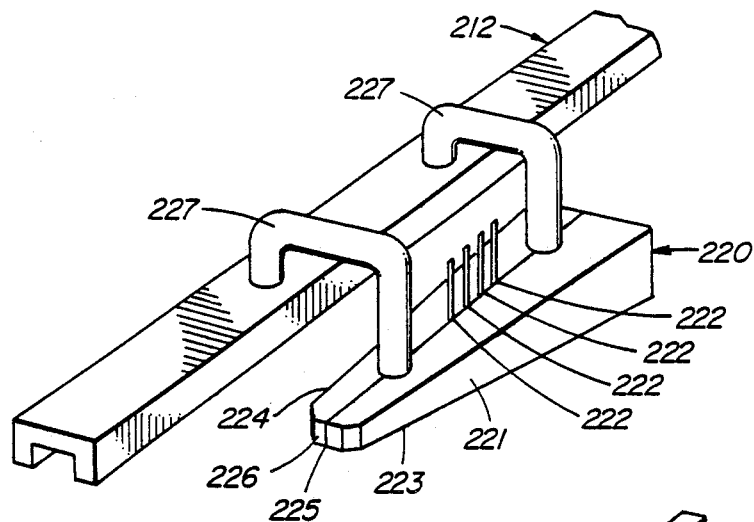
FIG. 6 is a perspective view of a frame mountable optical connector part of an optical connector part according to a second embodiment.
Figure 7:
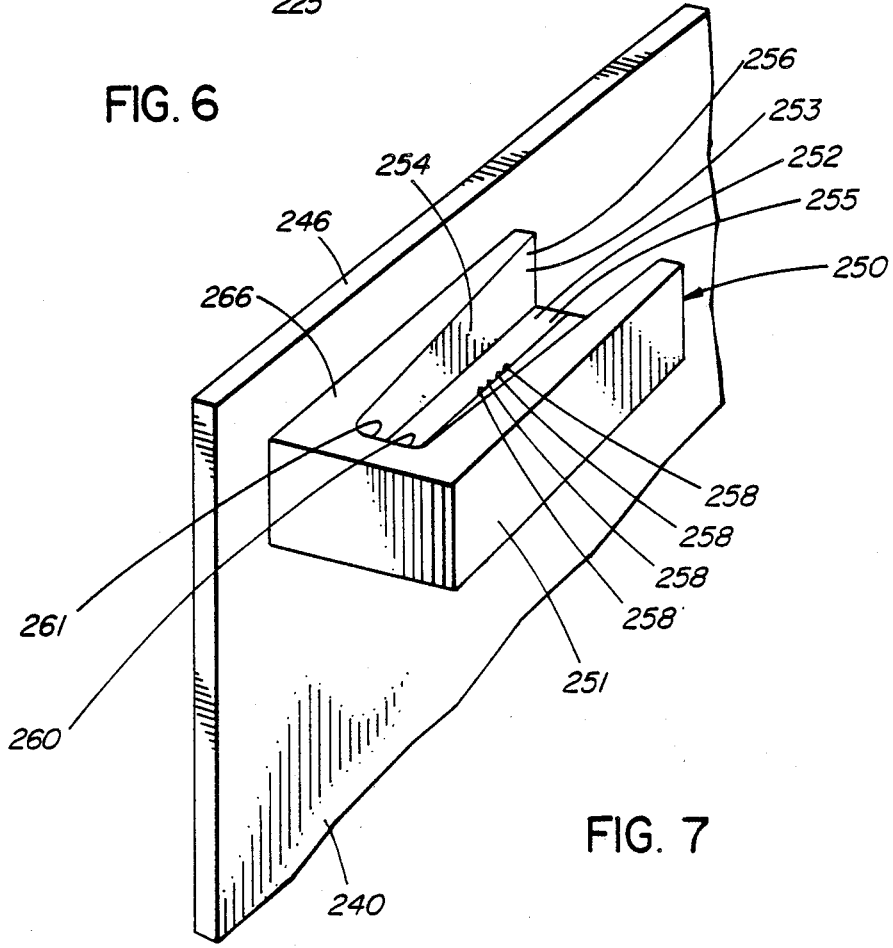
FIG. 7 is a perspective view of a circuit board mountable optical connector part according to the second embodiment.

FIGS. 6 and 7 show connector parts of an optical connector according to a second embodiment. Referring to FIG. 6, a frame mounted optical connector part 220 comprises a connector body in the form of a plug member 221 carrying a plurality of optical elements in the form of large core optical fibers 222 having parallel optical axes. The plug member 221 has a guide formation in the form of an external base surface 223 and an external side surface 224, both of which extend in a direction transverse to the optical axes. The external base surface 223 is inclined upward toward a leading edge 225 of the plug member 221 and the leading edge 22 of the plug member 221 is bevelled at the side surface 224 to facilitate entry of the plug member 221 into a receptacle member as described below. The leading edge 225 acts as a stop means as described below, and together with the base surface 223 and side surface 224 defines an external reference corner 226 of the plug member 221.

The plug member 221 further comprises resilient mounting means in the form of resiliently deformable arms 227 which join the plug member 221 to an adjacent card guide 212. The arms 227 are integrally joined to the plug member 221 in a manner which permits limited angular movement of the plug member 121 with respect to each arm 227 in planes parallel to and perpendicular to the card guide 212.

Referring to FIG. 7, a board mounted optical connector part 250 comprises a connector body in the form of a receptacle member 251 having a channel formation in the form of a base 252 and side walls 253 defining a channel 254. The base 252 carries a plurality of optical elements in the form of a large core optical fibers 258 having parallel optical axes.

The receptacle member 251 has a guide formation in the form of an internal base surface 255 and an internal side surface 256 of the channel 254. These surfaces 255, 256 extend in a direction transverse to the optical axes of the large core optical fibers 258.

The receptacle member 251 has stop means in the form of an end wall 260 extending across the channel 254. Together with the base surface 255 and side surface 256, the end wall 260 defines an internal reference corner 261 of the receptacle member 251.

The receptacle member 251 further comprises rigid mounting means in the form of a rigid mounting foot 266 which is secured to a circuit board 240 at a location spaced inwardly from a side edge 246 of the circuit board 240.

Figure 8A:
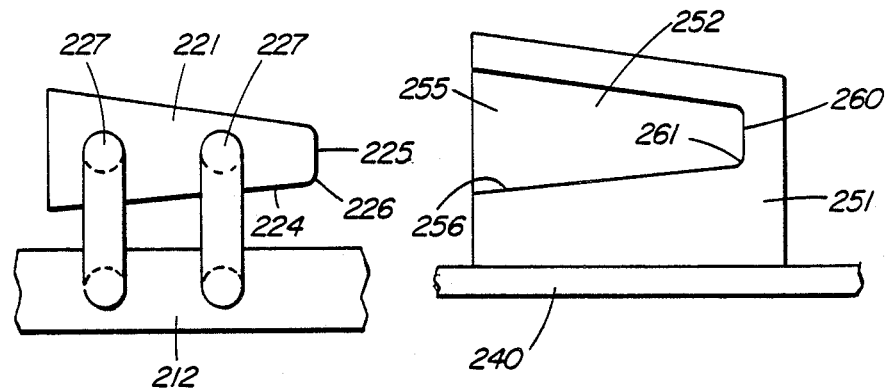
FIGS. 8a–8c are top views of the optical connector parts of FIGS. 6 and 7 in successive positions as the optical connector parts are mated.
Figure 8B:
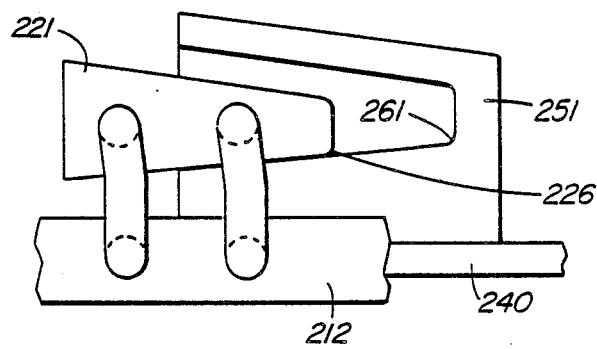
Figure 8C:
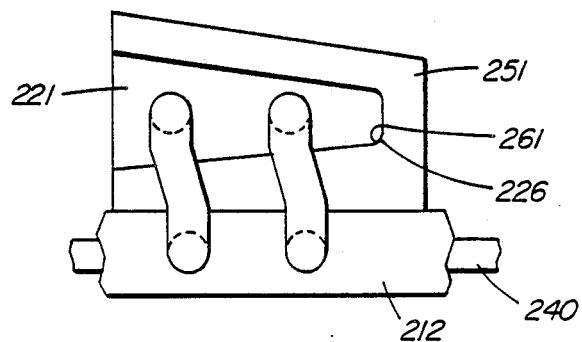
Figure 9A:
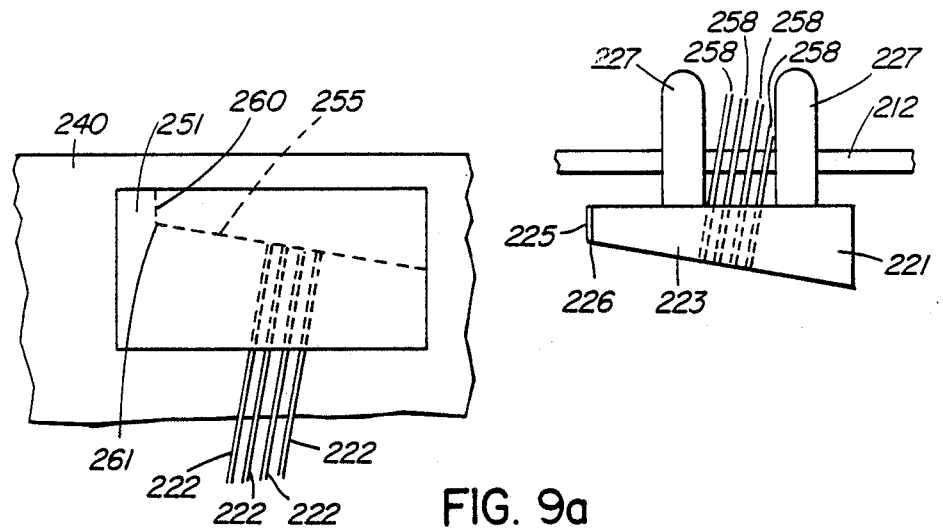
FIG. 9 is a side elevational view of the optical connector parts of FIGS. 6 and 7 in successive positions as the optical connector parts are mated.
Figure 9B:
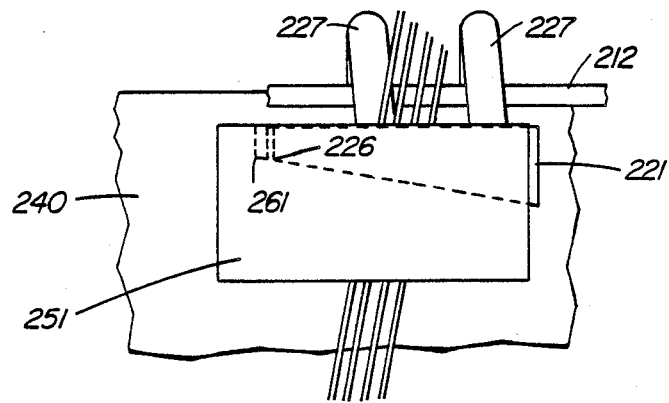
Figure 9C:
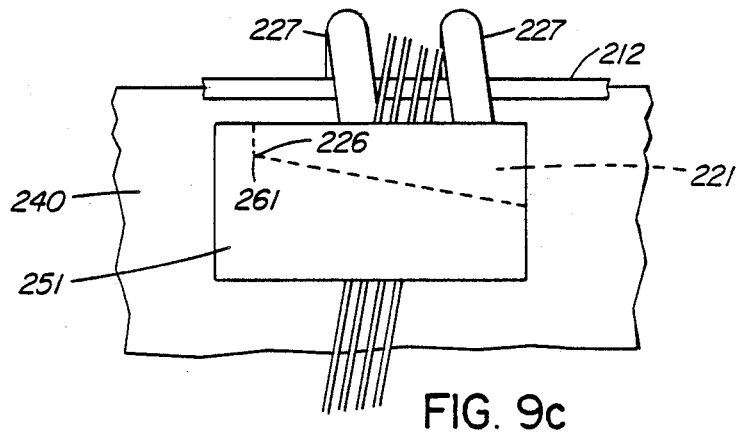

As shown in FIGS. 8 and 9, when circuit boards 240 are inserted into card guides 212 the circuit boards 240 slide rearward within the card guides 212 until leading edges of the circuit boards contact a back plane and the board edge electrical contacts enter the board edge electrical connectors to electrically interconnect the circuit boards 240 as in the first embodiment.

As the circuit boards 240 slide rearward within the card guides 212, the optical connector receptable members 251 engage the optical connector plug members 221, the internal base and side surfaces 255, 256 of the receptacle members 251 slidably engaging the external base and side surfaces 223, 224 of the plug members 221 to guide the receptacle members 251 in a direction transverse to the optical axes of the large core fibers 222, 258 over the plug members 221. The bevelled leading edges 225 of the plug members 221 facilitate entry of the plug members 221 into the channels 254 of the receptacle members 251.

As the receptacle members 251 slidably engage the plug members 221, the end walls 260 of the channels 254 engage the leading edges 225 of the plug members 221 to fix the position of the plug members 221 within the channels 254. The resilient arms 227 joining the plug members 221 to the card guides 212 deform as necessary to enable the plug members 221 to enter and take the desired position within the channels 254.

The plugs 221 are held in position within the channels 254 by the action of latching mechanisms (not shown) which latch the circuit boards 240 in position within the card guides 212 combined with the action of the resilient arms 227 which urge the external reference corners 226 of the plug members 221 firmly into the internal reference corners 261 of the receptacle members 251. As shown in FIGS. 8 and 9, the plug members 221 are positioned on the card guides 212 and the receptacle members 251 are positioned on the circuit boards in positions which ensure that resilient arms 227 must deform upward, sideways and rearward. This ensures that the external reference corners 226 are firmly urged downward, sideways and forward into the internal reference corners 261 when the circuit boards 240 are latched in place.

The distance between the external side surfaces 224 of the plug members 221 and the optical axes of the large core fibers 222 is substantially equal to the distance between the internal side surfaces 256 of the channels 254 and the optical axes of the large core fibers 258. The distance between the leading edges 225 of the plug members 221 and the optical axes of the large core fibers 222 is substantially equal to the distance between the end wall 258 of the channel 258 and the optical axes of the large core fibers 258. As a result, when the plug members 221 are held in position in the channels 254, the optical axes of the large core fibers 222 are aligned in a direction transverse to the direction of insertion with the optical axes of the fibers 258 to optically couple each large core fiber 222 to a respective large core fiber 258.

Figure 10:
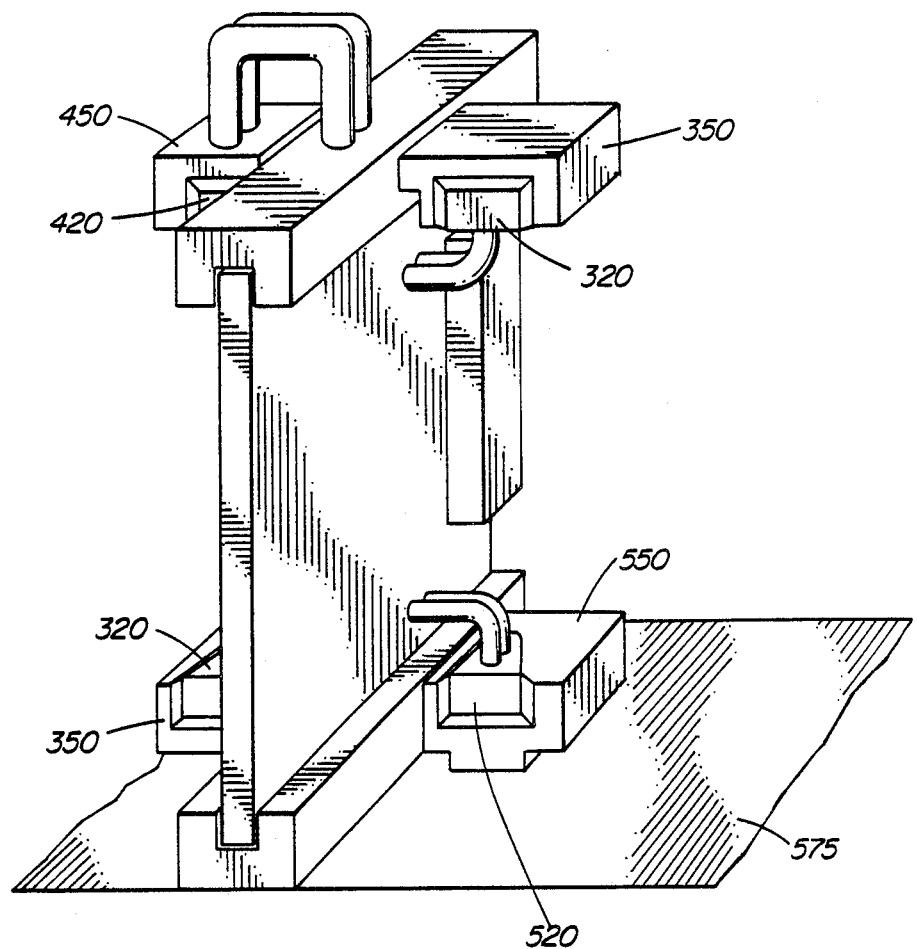
FIG. 10 is a perspective view of card guides containing circuit boards, the card guides and circuit boards carrying optical connectors according to third, fourth and fifth embodiments.

Numerous modifications of the embodiments described above will be apparent to those skilled in the optical interconnection art. For example, plug members 320 could be mounted to circuit boards to mate with frame mounted receptacle members 350 as shown in FIG. 10. Receptacle members 450 could be resiliently mounted to mate with rigidly or resiliently mounted plug members 420 as shown in FIG. 10. The leading edges of receptacle members 350, 450, 550 could be bevelled to facilitate entry of plug members 320, 420, 520 into the receptacle members 350, 450, 550 as shown in FIG. 10.

Moreover, connector bodies 320, 420, 520 could be mounted adjacent to both side edges on both surfaces of circuit boards to cooperate with connector bodies 350, 450, 550 on both sides of both card guides holding each board, thereby providing four connector bodies per circuit board as shown in FIG. 10. Each connector body could extend virtually the entire length of its circuit board and carry a very large number of optical elements in one or more rows or arrays. Thus, an enormous number of optical connections could be provided for each circuit board without congesting the leading edge of the circuit board or the back plane of the frame.

The frame mounted connector bodies could be mounted to parts of the frame other than the card guides, for example top and bottom planes of each shelf. FIG. 10 shows a connector body 550 mounted to a bottom plane 575 of a shelf.

Indeed, frames could be supplied with optical connector bodies already in place as "optical shelves". Alternatively, "optical connection planes" comprising card guides and connector bodies could be supplied for assembly into "optical shelves".

The modifications described above are within the scope of the invention as claimed below.

I claim:
1. An optical connector comprising:
 a first connector body carrying a first optical element having a first optical axis, the first connector body having a first guide formation extending in a direction transverse to the first optical axis and a first stop means extending in a direction transverse to the first guide formation; and a second connector body carrying a second optical element having a second optical axis, the second connector body having a second guide formation extending in a direction transverse to the second optical axis and a second stop means extending in a direction transverse to the second guide formation, sliding engagement of the first guide formation with the second guide formation guiding movement of the first connector body with respect to the second connector body in a direction transverse to the first and second optical axes to bring the first stop means into engagement with the second stop means and the first optical axis into alignment with the second optical axis.

2. An optical connector as defined in claim 1, wherein:

the first connector body comprises a channel formation defining a channel extending in a direction transverse to the first optical axis;

the second connector body comprises a member which is slidably receivable within the channel;

the first guide formation comprises at least one internal surface of the channel formation; and the second guide formation comprises at least one external surface of the member.

3. An optical connector as defined in claim 2, wherein at least one of the guide formations is bevelled at a leading edge to facilitate sliding insertion of the member into the channel.

4. An optical connector as defined in claim 2, wherein:

the first guide formation comprises internal base and side surfaces of the channel formation; and the second guide formation comprises external base and side surfaces of the member.

5. An optical connector as defined in claim 4, wherein the external base and side surfaces of the member are bevelled at a leading edge of the member to facilitate sliding insertion of the member into the channel.

6. An optical connector as defined in claim 1, wherein at least one of the connector bodies comprises a member and resilient mounting means for resiliently mounting the member to a rigid support.

7. An optical connector as defined in claim 6, wherein the resilient mounting means comprises at least one resiliently deformable arm joined to the member in a manner which permits limited angular movement of the member with respect to the arm.

8. An optical connector as defined in claim 7, wherein the arm is joined to the member by a ball-in-socket joint.

9. An optical connector as defined in claim 7, wherein the arm is integrally joined to the member.

10. An optical connector as defined in claim 7, wherein the resilient mounting means comprises a pair of resiliently deformable arms, each arm joined to the member in a manner which permits limited angular movement of the member with respect to each arm.

11. An optical connector as defined in claim 6, wherein the other of the connector bodies comprises a another member and rigid mounting means for rigid mounting of said other member to another rigid support.

12. An optical connector as defined in claim 2, wherein:

the first stop means comprises at least one stop element projecting into the channel remote from a leading edge of the channel; and the second stop means comprises a leading edge surface of the member.

13. An optical connector as defined in claim 12, wherein two stop elements are provided, each stop element comprising a triangular spring projecting inward from a respective internal side surface of the channel, and the leading edge surface of the member is bevelled so as to be complementary to the triangular springs.

14. An optical connector as defined in claim 1, further comprising releasable latching means for releasably latching the first connector body to the second connector body with the first optical axis in alignment with the second optical axis.

15. An optical connector as defined in claim 2, further comprising releasable latching means for releasably latching the first connector body to the second connector body with the first optical axis in alignment with the second optical axis, the releasable latching means comprising opposed resilient means projecting inward from respective recesses in respective internal side surfaces of the channel, the resilient means being deformable from an undeformed configuration in which they project inward into the channel to inhibit sliding motion of the member within the channel to a deformed configuration substantially within respective recesses in which they permit sliding motion of the member within the channel.

16. An optical connector as defined in claim 15, wherein the resilient means comprise triangular springs and a trailing edge surface of the member is bevelled so as to be complementary to the triangular springs.

17. An optical connector as defined in claim 2, wherein:

the first guide formation comprises an internal base surface and an internal side surface of the channel formation;

the first stop means comprises an internal end surface of the channel formation, the internal end surface meeting the internal base surface and the internal side surface to define an internal reference corner;

the second guide formation comprises an external base surface and an external side surface of the member;

the second stop means comprises an external end surface of the member, the external end surface meeting the external base surface and the external side surface to define an external reference corner; and sliding engagement of the internal base and side surfaces with the external base and side surfaces guides movement of the first connector body with respect to the second connector body in a direction transverse to the first and second optical axes to bring the internal end surface into engagement with the external end surface and the internal reference corner into engagement with the external reference corner, thereby bringing the first optical axis into alignment with the second optical axis.

18. An optical connector as defined in claim 1, wherein at least one of the first and second optical elements comprises a lens.

19. An optical connector as defined in claim 18, wherein the lens comprises a graded index rod lens.

20. An optical connector as defined in claim 18, wherein one of the first and second connector bodies carries an optoelectronic device which is optically coupled to the lens carried by said connector body.

21. An optical connector as defined in claim 18, wherein one of the first and second connector bodies carries an optical fiber which is optically coupled to the lens carried by said connector body.

22. An optical connector as defined in claim 1, wherein at least one of the first and second optical elements comprises an optoelectronic device.

23. An optical connector as defined in claim 1, wherein at least one of the first and second optical elements comprises an optical fiber.

24. An optical connector as defined in claim 1, wherein the first connector body carries a first plurality of optical elements having a first plurality of parallel optical axes and the second connector body carries a second plurality of optical elements having a second plurality of parallel optical axes, sliding engagement of the first guide formation with the second guide formation guiding movement of the first connector body with respect to the second connector body in a direction transverse to each optical axis of the first and second pluralities of optical axes to bring the first stop means into engagement with the second stop means and each of the first plurality of optical axes into alignment with a respective one of the second plurality of optical axes.

25. An optical connector comprising:
a first connector body carrying a first optical element having a first optical axis, the first connector body having a first guide formation extending in a direction transverse to the first optical axis, the first guide formation being spaced a first predetermined distance from the first optical axis in a direction transverse to the first guide formation, and a first stop means extending in a direction transverse to the first guide formation, the first stop formation being spaced a second predetermined distance from the first optical axis in a direction parallel to the first guide means; and
a second connector body carrying a second optical element having a second optical axis, the second connector body having a second guide formation extending in a direction transverse to the second optical axis, the second guide formation being spaced the first predetermined distance from the second optical axis in a direction transverse to the second guide formation, and a second stop means extending in a direction transverse to the second guide formation, the second stop formation being spaced the second predetermined distance from the second optical axis in a direction parallel to the second guide means, sliding engagement of the first guide formation with the second guide formation, guiding movement of the first connector body with respect to the second connector body in a direction transverse to the first and second optical axes to bring the first stop means into engagement with the second stop means and the first optical axis into alignment with the second optical axis.

* * * * *